United States Patent Office 3,522,017
Patented July 28, 1970

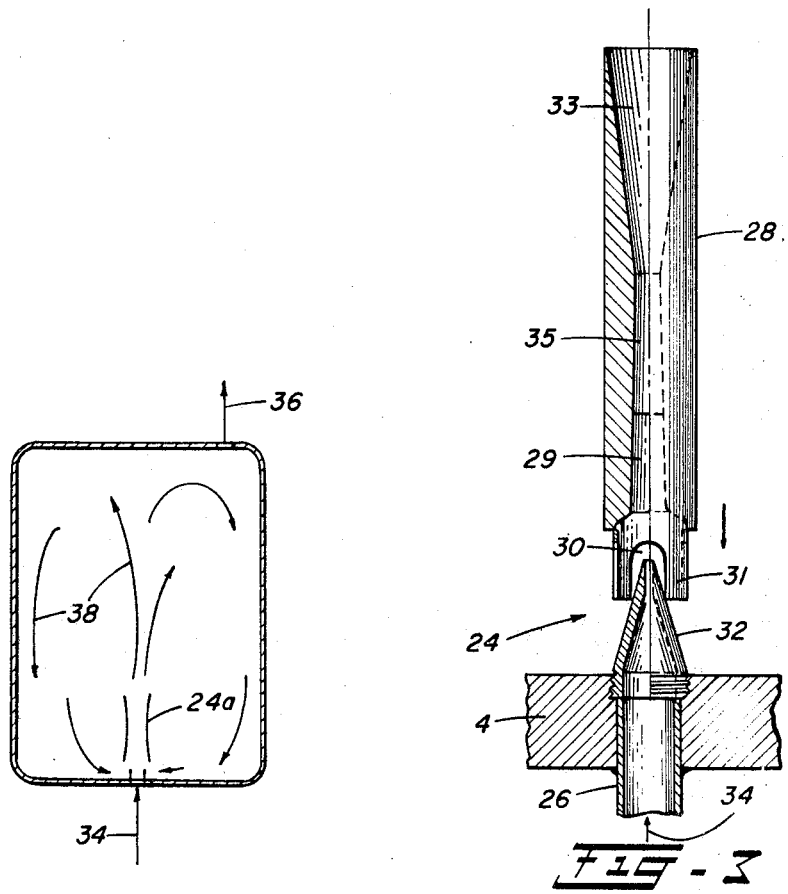

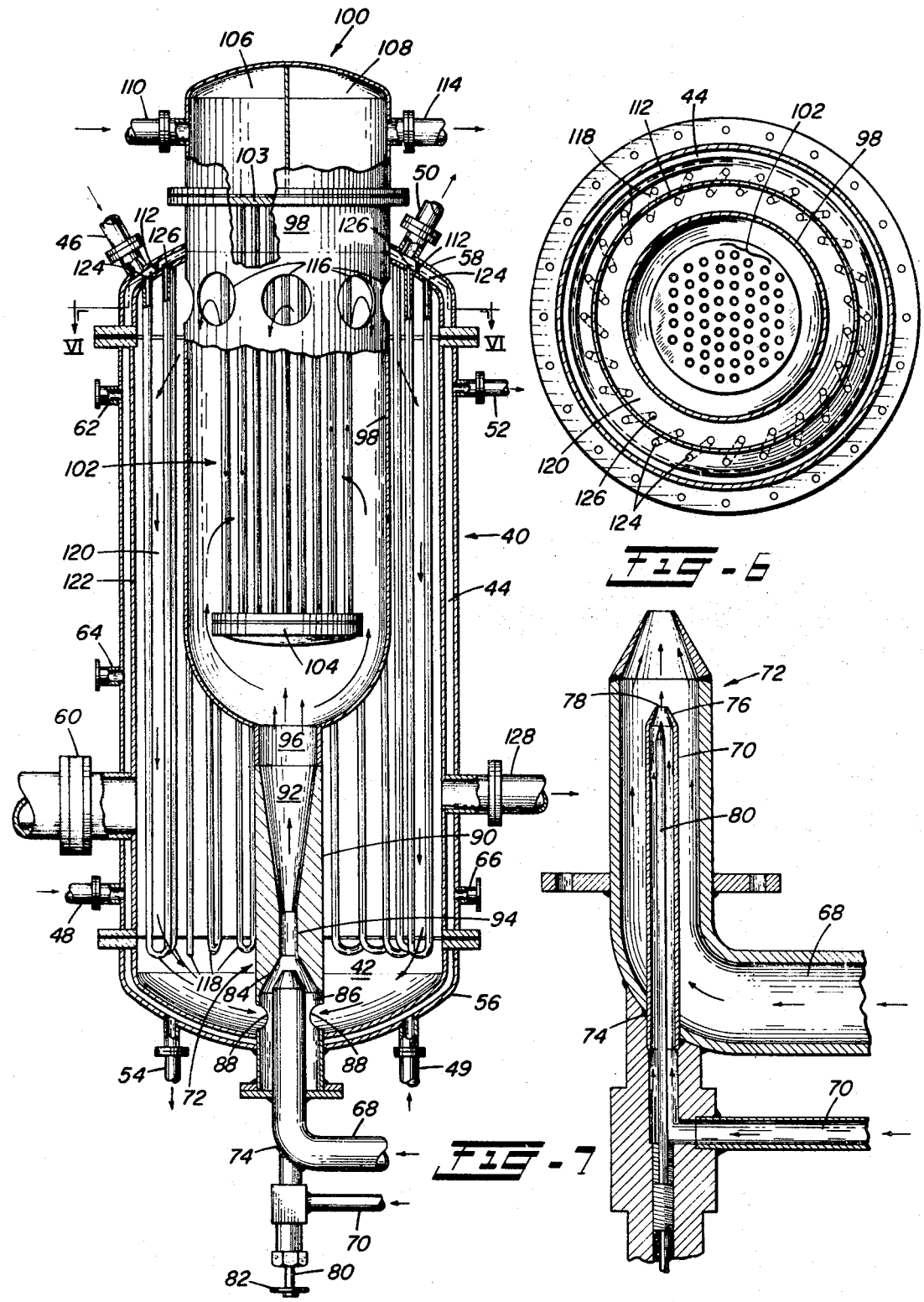

3,522,017
REACTOR FOR CONDUCTING CONTROLLED-TEMPERATURE GAS PHASE REACTIONS WITH MIXING
Jesse P. Barfield, Jr., Madison, N.J., assignor to Celanese Corporation, a corporation of Delaware
Original application July 13, 1964, Ser. No. 382,224. Divided and this application Jan. 29, 1968, Ser. No. 725,971
Int. Cl. B01j 1/14; F28f 13/12
U.S. Cl. 23—277         10 Claims

ABSTRACT OF THE DISCLOSURE

A reactor for conducting vapor-phase reactions, such as the oxidation of an inorganic vapor with molecular oxygen, comprises a reaction chamber containing heat transfer means, such as a heat exchanger, and an eductor mounted through a wall of the reaction chamber and discharging toward the heat exchanger. The eductor is actuated by the gases being fed into the reaction chamber, and its suction ports communicate with the interior of the chamber so that the gases contained in the chamber are continuously mixed and discharged from the eductor through the heat exchanger and drawn back into the eductor through its suction ports. The apparatus provides thorough continuous mixing of feed gases with gases contained in the reactor while also providing reaction temperature control.

---

This is a division of application Ser. No. 382,224, filed July 13, 1964, and now abandoned.

This invention relates broadly to a method of effecting chemical reactions, especially such reactions in the gaseous (including vaporous) phase. The invention is also broadly concerned with apparatus, more particularly a reactor, adapted for use in carrying out such chemical reactions. Still more particularly the invention relates to a method (including a continuous method) for carrying out exothermic chemical reactions in the gaseous phase, and to a reactor therefor.

Examples of exothermic gaseous reactions to which the present invention is applicable are the oxidation of ethane, propane, butane, isobutane, pentane and other alkanes, including mixtures thereof such as natural gas or petroleum refinery gases; the oxidation of other hydrocarbons, e.g., propylene, butylene and higher alkylenes, etc.; the chlorination of hydrocarbons including methane and other alkanes such as those just mentioned; and the oxidation of saturated aliphatic aldehydes such as acetaldehyde (AcH) to make peracetic acid (AcOOH). Numerous other examples of exothermic gaseous reactions will be found in the various textbooks on organic chemistry, e.g., Whitmore's "Organic Chemistry," Second Edition, 1951, published by D. Van Nostrand Company, Inc. (New York). The instant invention is particularly suitable for use in those situations where free-radical chain reactions are carried out in the absence of a catalyst or under mild catalytic conditions.

In the production of AcOOH, for example, wherein AcH is oxidized with oxygen by admixing AcH with a sufficient amount of gaseous $O_2$, it is necessary to maintain oxygen conversion at desired levels (reference: Bludworth U.S. Pat. No. 2,314,385). In order to achieve this, the reactor must be capable of being brought to desired temperature levels in a smoothly controlled manner with reactor pressures stabilizing at a safe and constant value. Uneven and incomplete mixing of fresh AcH and $O_2$ in the reactor, with the resultant widely varied degree of $O_2$ conversion, presents serious heat-transfer and pressure-control problems.

In prior methods of effecting exothermic chemical reactions such as the controlled oxidation of AcH with $O_2$ to AcOOH, it has been common practice to use internal mechanical agitating devices such as fans to obtain even and thorough mixing of the fresh AcH and $O_2$ in the reactor; and, also, to effect backmixing of the gaseous contents of the reactor with the fresh feed entering the reactor. This has not been completely satisfactory because, for one reason, such means did not obviate the aforementioned heat-transfer and pressure-control problems. Furthermore, the acidic nature of the gaseous contents of reactors that are thus used in making AcOOH causes all internal mechanical agitating devices to be subjected to severe acid attack. These acid attacks cause breakdowns of such agitating means to occur too frequently with resultant highly undesirable contamination of the desired gaseous reaction products.

It was suggested prior to the present invention (see, for example, U.S. Pat. No. 2,441,528, dated May 11, 1948) that gas-phase, exothermic reactions be effected in a reactor comprising the combination of an elongated reaction chamber; a gas inlet tangentially disposed adjacent to one end of said chamber, which inlet is in the form of an injector; a gas outlet near the opposite end of the chamber; and a recirculating duct extending from the outlet end of the reaction chamber to the suction side of the injector. Such apparatus has the disadvantage that the flow of the gaseous reaction mixture from the outlet end of the reaction chamber to the suction side of the injector is limited to a restricted pattern with obvious disadvantages including inadequate mixing of the gases, non-uniform temperature throughout the reaction chamber and recirculating duct, etc.; and, further, in that no positive means are provided for dissipating the heat of the reaction from the reactor.

It is a primary object of the present invention to provide apparatus for effecting chemical reactions in the gaseous phase and which avoids the disadvantages inherent in such apparatus wherein fans or other mechanical agitating means are employed for mixing the gaseous reactants in the reactor. By eliminating the need for mechanical stirring, which causes or results in difficulties through leaking seals, entrance of foreign material into the reactor, failure of centrifugal apparatus such as fans, etc., the invention provides simpler, safer and better control of the operation of the apparatus.

Another object of the invention is to provide apparatus of the aforementioned kind and wherein means are provided for circulating and increasing the velocity of the gases in the reactor, thus increasing the transfer of heat in the reactor.

Another object of the invention is to provide apparatus of the kind hereinbefore described and wherein positive means are provided for dissipating from the reaction zone at least part of the heat generated by the exothermic chemical reaction between the gaseous reactants in said zone.

Stil another object of the invention is to provide apparatus of the kind described above such that, when oxygen or similar gas that can or may form an explosive mixture is one of the reactants, the oxygen content of the feed stream to the reactor can be quickly diluted, thus permitting safer operation of such apparatus.

A further object of the invention is to provide an improved gas-phase reactor for carrying out chemical reactions, such as the oxidation of acetaldehyde with oxygen to paracetic acid, whereby substantially total backmixing of the gaseous contents of the reactor with the fresh feed to the reactor is obtained, and the fresh feed is quickly diluted with the reactor contents, thereby placing chain-reaction initiators evolved during initial reaction between the gaseous reactions in close proximity to the feed stream.

Another object of the invention is to provide an improved method of effecting exothermic chemical reactions in the gaseous phase, and specifically an improved method of making peracetic acid by the oxidation of vapors of acetaldehyde with an oxidizing oxygen-containing gas such as air, commercial oxygen, etc.

Other objects of the invention will be apparent to those skilled in the art from the following more detailed description and from the accompanying drawing, which is illustrative of a preferred embodiment of the invention.

The novel features of the invention are set forth in the appended claims. The invention itself, however, will be more readily understood from the following description taken in connection with the accompanying illustrative drawing, and wherein FIG. 1 is a plan view, partly broken away, of apparatus (e.g., a reactor) embodying the invention;

FIG. 3 is a side sectional, slightly exploded view of part of the apparatus shown or indicated in FIGS. 1 and 2; and FIG. 4 is a view illustrating schematically the general movement of the gaseous contents of apparatus of the kind illustrated in FIGS. 1 and 2 when the apparatus is in operation.

FIG. 5 is a side elevational view, partly in section and partly broken away, of apparatus comprising another embodiment of the invention;

FIG. 6 is a sectional view taken along the line VI—VI of FIG. 5; and

FIG. 7 is an enlarged side elevational view, partly in section, of a portion of the jet means and of the reactants-feed means shown in FIG. 6.

Figure 1:
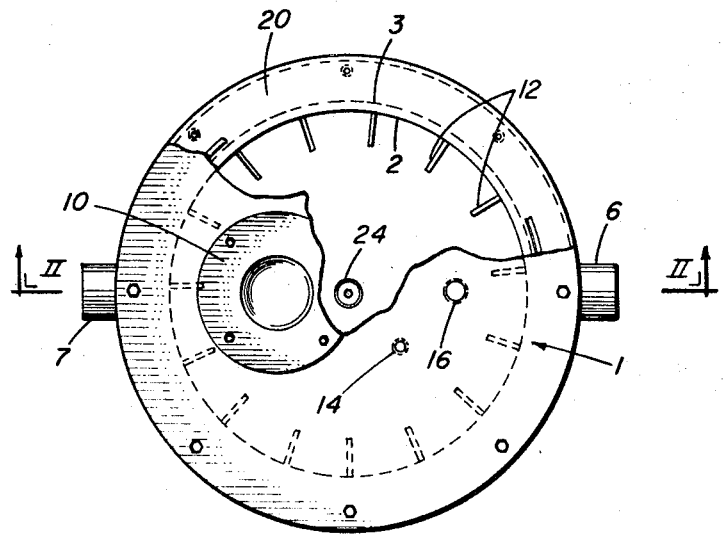
Figure 2:
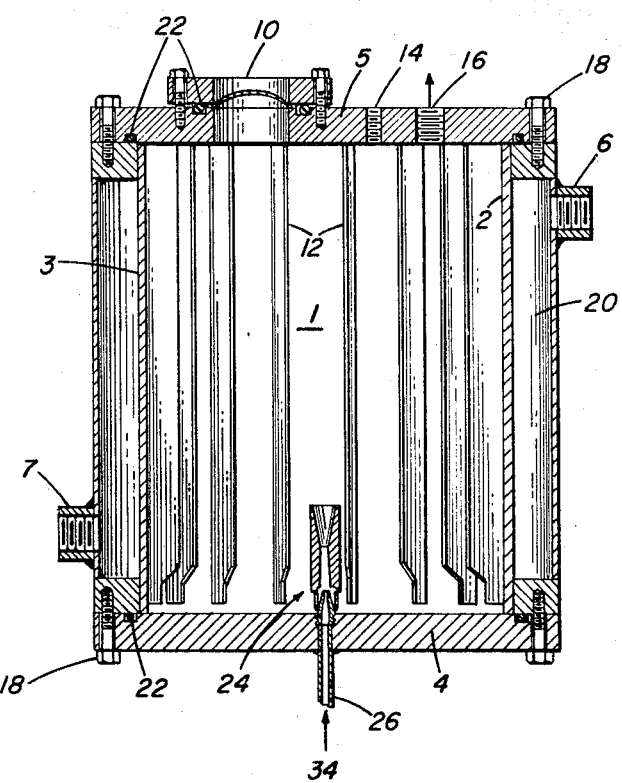
FIG. 2 is a side sectional view of the apparatus shown in FIG. 1.

With reference to the drawing and especially to FIGS. 1 and 2 thereof, there is shown by way of illustration apparatus that is suitable for use in practicing the method of the invention. This apparatus includes a reaction chamber 1, more particularly a cylindrical reaction chamber, having inner side wall 2, outer side wall 3, and spaced-apart end walls, more particularly bottom wall 4 and top wall 5 opposite to each other. Heat-dissipation means including projections, e.g., longitudinal fins 12, are spaced apart along the circumference of, and attached to (e.g., by welding), the inner side wall 2 of the reaction chamber 1. These fins extend partway inwardly toward the axis of the reaction chamber. The fins 12 are formed of heat-conducting material, and preferably such materials which are resistant to attack by hot acetic and peracetic acids, e.g., aluminum, tin, magnesium, etc., and which serve to dissipate from the reaction zone at least part of the heat generated by the exothermic chemical reaction between the gaseous reactants in the reactor. The fins also serve to direct the flow of the gas.

Jet means 24 extend into the reaction chamber 1 through one end wall thereof, e.g., the bottom wall 4. Through the single jet means, or a plurality thereof (e.g., 2, 3, 4, 6, or any desired number), is charged, through each of the individual jet means, a mixture of the gaseous components constituting the gaseous reaction feed to the reaction chamber. As a result, the gaseous contents of the reaction chamber are drawn into the aforesaid jet means and are discharged within the reaction chamber thoroughly mixed with the fresh feed.

The invention also includes means, e.g., the opening 16 in the end wall 5, for withdrawing the reaction products from the reaction chamber.

As shown in FIGS. 1 and 2 the apparatus of the present invention also preferably includes a heat-transfer jacket 20 surrounding the side of the reaction chamber 1. This heat-transfer jacket is provided with an inlet opening 6 and an exit opening 7 through which is circulated a suitable heat-transfer fluid, e.g., water, ethylene glycol, diethylene glycol, ethylene glycol monoethyl ether, ethylene glycol monobutyl ether, diphenyl, diphenyl oxide, etc., or other commercially available heat-transfer fluids, for transferring heat from the reaction chamber to the exterior thereof.

The end walls of the reactor (bottom wall 4 and top wall 5) are shown in FIG. 2 as being detachably removable. However, such construction is not essential so long as other suitable openings are provided in the reactor, e.g., an opening or openings in the walls of the reactor for permitting access to, and inspection of, the interior of the reactor; and for introducing the jet means 24 to, and removing it from the reactor for inspection, cleaning, adjusting, replacing, etc. For example, the end walls of the reactor may be formed (e.g., by welding) so that they are continuous with the side wall, and openings with flanged closures of suitable size then may be provided in the bottom and/or top wall to permit access to, and inspection of, the reactor. Or, one of the walls such as the bottom wall 4 may be constructed as shown in FIG. 2 while the opposite wall is constructed so that it is continuous with the side wall.

In the reactor illustrated in FIG. 2 the top and bottom heads or walls are both made detachably removable by using threaded bolts 18 to hold them in position. O-rings 22 seal the joints against gaseous leakage.

The reactor may be provided with any suitable device for quickly releasing the gaseous contents of the reactor and thus obviate dangerous exposions if and when the contents are of an exposive nature. For example, such means may take the form of one or more rupture-disc assemblies. One such assembly is indicated by the numeral 10 in FIGS. 1 and 2.

The reactor also is provided with suitable temperature-measuring means, e.g., the thermocouple 14, of which there may be as many as desired or required at various points in the reactor.

The feed to the reactor enters through a conduit 26, and gaseous reaction products are discharged though a conduit connected to the discharge opening 16.

In some cases the reaction chamber 1 may be an elongated reaction chamber. In general, however, it is preferred that the reaction chamber be designed so that the ratio of exposed surface to volume in said chamber is below about 1 cm.$^{-1}$.

FIG. 3 is a side sectional, slightly exploded view of suitable jet means designated generally as 24 in FIGS. 1 and 2, of part of the bottom wall 4, and of part of the feed conduit 26, which, if desired, may be externally threaded at its terminal end as shown in the drawing.

As shown by way of illustration in FIG. 3, the jet means 24 comprises an actuating nozzle 32 having a threaded base which is screwed into a threaded opening in the bottom wall 4. This nozzle is suitably united to the terminal end of the conduit 26; for example, it may be screwed into a threaded terminal end of the said conduit. Any other suitable means for detachably (as by means of a threaded couple) or fixedly uniting the nozzle 32 with the terminal end of the conduit 26 may be employed. For example, nozzle 32 may be welded to the end of conduit 26.

In addition to the actuating nozzle 32 through which the feed to the reactor first passes, the jet means also includes a mixing nozzle 29 to which is attached a skirt 31 provided with inlets or openings for the entrance of the gaseous contents of the reactor. Such openings are indicated at 30 in FIG. 3 and represent two oppositely disposed openings or slots, the horizontal axis of which is at right angles to the horizontal axis of the other openings or slots. Or, the skirt 31 may be provided with, for example, 5 through 12 or any other number of spaced-apart openings or slots, provided that the resulting skirt has adequate physical strength. The skirt 31 is tack-welded to the actuating nozzle 32, the outlet of which is vertically aligned with the vertical axis of the mixing nozzle 29. For clarity in illustration, the eductor of the jet means is shown as being slightly raised from the actuating nozzle 32 than is its normal position during operation of the apparatus.

The jet means, such as one comprising the eductor 28 shown by way of illustration in FIG. 3, has a discharge end which comprises a diffuser 33 connected to one end of a throat 35 that is connected at the other end to the mixing nozzle 29. Of course it will be understood by those skilled in the art that the aforesaid diffuser, throat and mixing nozzle are one continuous passageway, and that the terms "throat" and "mixing nozzle" merely designate different areas of the same passageway leading to the diffuser; also, that the "throat" and "mixing nozzle" together constitute a mixing area wherein gaseous admixing in varying degrees takes place.

It will be understood, of course, by those skilled in the art that the dimensions and construction of the various elements of the jet means will vary with the composition of the particular gaseous feed to the reactor, the rate of feed, the rate of reaction of the gaseous components of the feed, the size of the reaction chamber of the reactor, the operating pressure, the optimum residence time, and other influencing factors. Some of dimensions of jet means used in injecting a gaseous feed of acetaldehyde and oxygen into a reactor having a volume of 4.4 gallons are as follows: diameter of the diffuser at its blunt-edged exit end: 5/8"; taper of the diffuser: 8°; overall length of the eductor from the end of the skirt to the end of the diffuser: 3¾"; length of the throat: 1"; length of the mixing nozzle and skirt: 1¼"; taper of mixing nozzle: 3°36'; diameter of the mixing nozzle at its lower end: approximately 0.263"; diameter of the mixing nozzle ⅛" above its lower end: 0.250"±0.002"; diameter of slots in skirt: 3/16"; diameter of sharp-edged exit end of actuating nozzle: 1/16"; internal diameter of inlet end of actuating nozzle: ⅜". In the foregoing apparatus the exit or outlet end of the actuating nozzle is preferably placed into the lower part of the mixing nozzle at the point where the diameter of said nozzle is 0.250±0.005".

The materials of which the internal portions of the reactor, e.g., the reaction chamber, the jet means and the longitudinal fins, are constructed should be those having the required strength, refractory and other physical properties, as well satisfactory fabrication characteristics; and, additionally, having surfaces that provide maximum resistance to attack by the gaseous components of the feed and by the gaseous reaction products. For example, in the oxidation of AcH in the vapor phase with gaseous $O_2$ to make AcOOH, the above elements may be fabricated of aluminum or magnesium; or they may be constructed of these or other materials such as steel as a substrate, and then surfaced with a corrosive-resistant metal such as tin or with a corrosive- and heat-resistant organic material such as solid polymeric halogenated organic compounds, e.g., the various solid polymeric fluorinated hydrocarbons including poly-(tetrafluoroethylene).

For most uniform results, when an aluminum reactor is used, it is desirable to passivate the surfaces of the reactor. This may be effected, for example, by applying nitric acid to the inner surfaces of the reactor prior to use. One suitable treatment involves contacting the reactor with 50% aqueous nitric acid at room temperature (20°–30° C.) for about 16 hours, followed by rinsing with distilled water, washing with acetone, and then drying. Alternatively, the inner surfaces of the aluminum reactor may be passivated by carrying out the reaction of, for example acetaldehyde and oxygen therein for a prolonged period. Thus, one such passivation treatment involves feeding a mixture of 16 mole percent oxygen and 84 mole percent acetaldehyde to the reactor for a period of 16 hours while gradually increasing the reactor temperature from an initial temperature of 140° C. to a final temperature of 160° C. while adjusting the residence time to such a value that the extent of reaction of oxygen is kept at about 90% throughout the 16-hour period. After this treatment, the results obtained are substantially identical with those obtained upon passivation with nitric acid.

In a typical operation whereby the method of the invention is carried out, a feed stream of gaseous reactants from a supply source (indicated by the numeral 34 in FIGS. 1 and 2) is charged, more particularly injected, into the reaction zone or chamber 1 through a conduit 26 having attached to its outlet or discharge end an actuating nozzle 32 which forms part of jet means 24. The actuating nozzle is positioned beneath the eductor portion of the jet means as has been described hereinbefore. The initially entering gaseous feed stream passes through the eductor and is discharged from its exit end into the reaction zone.

The chosen reactive gaseous components of the feed stream chemically react, as by an exothermic chemical reaction, in the reaction zone to form a mixture (a) of gaseous reactants and gaseous reaction products. When the jet means including the eductor (indicated by 24a) is in operation, there is drawn into the stream of gaseous reactants, after said stream enters the reaction zone, a portion of the aforesaid mixture (a) that is already in said zone. The gaseous flow pattern is indicated schematically by the arrows 38 in FIG. 4, the lower arrows indicating the drawing or sucking of the gaseous mixture (a) into the gaseous feed stream. In this way the aforementioned portion of the gaseous mixture (a) is thoroughly commingled with the injected feed stream of gaseous reactants to form gaseous mixture (b).

The gaseous mixture (b) is discharged from the exit end of eductor 24a so that it circulates throughout the reaction zone; and, also, so that a portion thereof is drawn into the injected feed stream of gaseous reactants as hereinbefore described.

When the method of the instant invention is employed in carrying out exothermic chemical reactions; and for which purpose both the apparatus and the method of the invention are particularly adapted, then at least part of the heat generated by the exothermic chemical reaction between the reactants in the aforesaid feed stream is dissipated from the reaction zone.

In practicing the present invention dissipation of the heat from the reaction zone may be effected, for example, by means including passage of the gaseous mixture in said zone over heat-conducting surfaces that are in heat-transfer relationship with a body of circulating heat-transfer fluid adjacent to the side of the reaction zone. Such heat-conducting surfaces may include, for instance, heat-conducting projections or attachments that project partway inwardly from the reactor sidewall toward the central area of the reaction zone, such as a cylindrical reaction zone. These inwardly-projecting attachments to the sidewall may be in the form of fins, ribs, baffles, rings, continuous coil or series of continuous coils, and the like; and they may be arranged in any suitable pattern or spacing. For example, the heat-conducting surfaces may include longitudinally spaced-apart, heat-conducting longitudinal fins that project partway inwardly toward the vertical axis of the reaction zone, for instance as shown in FIGS. 1 and 2; or horizontally spaced-apart, heat-conducting bands or rings attached to the inner sidewall of the reaction zone.

When the desired degree of reaction has taken place between the gaseous components of the feed stream, the gaseous products of the reaction (including any unreacted components) are withdrawn from the reaction zone, for example as indicated by the numeral 16 in FIGS. 1 and 2.

FIGS. 5, 6 and 7 illustrate apparatus comprising another and preferred embodiment of the invention.

In this embodiment the reactor 40 comprises a reaction chamber 42 provided with a heat-transfer jacket 44. As shown in FIG. 5, this jacket is provided with suitable heat-transfer fluid inlets and outlets, such as fluid inlets 46, 48 and 49, and fluid outlets 50, 52 and 54. Fluid inlet 46 and fluid outlet 47 are for the primary purpose of supplying and removing heat-transfer fluid to and from the tubes of tube bundle 102 (FIG. 6). The heat-transfer fluid which is circulated through jacket 44 may be water or other heat-transfer fluid such as those mentioned hereinbefore with respect to the fluid circulated through heat-transfer jacket 20 (FIGS. 1 and 2).

The bottom wall or head 56 and top wall or head 58 of reactor 40 are shown as being detachably removable. However, the same remarks apply here concerning this construction as previously have been made with regard to the bottom wall 4 and top wall 5 of the reactor shown in FIG. 2.

Reactor 40 also is provided with suitable means, e.g., with one or more rupture-disc assemblies, for quickly releasing the gaseous contents of the reactor if and when necessary. One such assembly 60 is shown in FIG. 5. Thermowells such as those indicated by reference numerals 62, 64 and 66 also are provided for inserting therein suitable temperature-measuring means such as thermocouples.

The feed material enters the reactor 40 through the feed conduit 68, which carries one gaseous reactant such as, for example, AcH; and the feed conduit 70, which carries a different gaseous reactant such as, for instance, commercial $O_2$. The feed conduits 68 and 70 pass through an opening in bottom wall 56 as shown in FIG. 5, and the reactants enter the jet means 72 as shown in FIGS. 5 and 7.

The feed conduit 70 enters the conduit 68 through an opening in a wall thereof as shown at 74 in FIGS. 5 and 7. In this way the two feeds are separately carried upwards in parallel streams through the jet means 72. The conduit 70 terminates in an actuating nozzle 76 (FIG. 7) having an opening 78. The size of opening 78 is controlled by adjusting needle valve 80 which is provided with a needle-valve control handle 82.

The jet means 72 also includes a mixing nozzle 84 to which is attached a skirt 86 provided with a plurality of suction ports such as those comprising the two indicated by the numeral 88 in FIG. 5. The opening or outlet 78 of the actuating nozzle 76 is in operative relationship with the mixing nozzle 84 and, more particularly, is vertically aligned with the vertical axis of the said mixing nozzle.

The jet means 72, which also comprises the eductor 90, has a discharge end which comprises a diffuser 92 connected to one end of a throat 94 that is connected at the other end to the mixing nozzle 84. The diffuser 92 is provided at its outlet end with an extension 96 that is connected to a heat-exchanger 98.

The heat-exchanger 98 is comprised of a split or divided, detachably-removable head 100 and a tube bundle 102 attached to an upper plate 103 and terminated by a lower head 104. The head 100 is comprised of head sections 106 and 108. Heat-transfer fluid enters the head section 106 through the fluid-inlet conduit 110. The free space in section 106 and the corresponding portion (e.g., one-half) of plate 103 constitute an inlet header to those tubes of the bundle 102 that carry the heat-transfer fluid downwardly to the lower head 104. From the lower head the heat-transfer fluid passes upwardly through the other tubes of the bundle that lead to the return or outlet header constituted of the free space in head section 108 and the remaining portion of plate 103, and thence through fluid-outlet conduit 114.

The heat-transfer fluid that is circulated through the tube bundle 102 may be water or other fluids such as those mentioned hereinbefore with respect to the fluid circulated through heat-transfer jacket 20.

The heat exchanger 98 is provided with a plurality of ports or openings as indicated by reference numeral 116 in FIG. 5. The openings may be of any suitable size, shape and number, e.g., circular and from 6 to 24 or more in number. They may be located at any suitable points in a wall or walls, more particularly side wall, of the heat exchanger. Preferably they are uniformly spaced-apart around the periphery of the side of the wall or shell of heat exchanger 98 at a point where the discharge of gases through the said ports will be at or close to the top of the reaction chamber 42.

Heat-dissipation means such as the heat-exchanger 98 makes possible better control of the temperature in the reaction chamber than can be obtained by using heat-dissipation means such as the longitudinal fins 12 shown in FIGS. 1 and 2. Exchanger 98 may be used, if desired, as the sole heat-dissipation means within the reaction chamber 42. However, if desired or as may be required, exchanger 98 or the like also may be used in conjunction with other heat-dissipation means within the chamber including, for example, fins or other projections that are spaced apart along the circumference of, and attached to, the inner side wall of the said chamber and which extend partway inwardly toward the chamber's central area.

Preferably the heat exchanger 98 is used in conjunction with other heat-exchange dissipation means within the reaction chamber 42 that includes a plurality of heat-exchange U-tubes 118 suitably positioned in the annular space 120 between the exterior of the shell of the heat-exchanger 98 (and the jet means 72 connected thereto) and the side wall 122 of the reaction chamber 42. Any suitable number, e.g., from 8 to 48 or more of such tubes in any suitable size, e.g., from ½" to 1½" or more outside diameter, may be arranged in the annular space 120 as shown by way of illustration in FIGS. 5 and 6.

The heat-transfer fluid that is passed through the U-tubes 118 may be water or other fluid of the kind hereinbefore mentioned for use as heat-transfer medium in practicing this invention. This heat-transfer fluid may be introduced into the U-tubes 118 through openings in the jacket 44 as indicated at 124 and discharged from the said U-tubes through openings in the said jacket as indicated at 126. The annular separator 112 prevents commingling of the heat-transfer fluids that enter and leave the U-tubes 118.

If desired, the U-tubes 118 may be modified by having attached thereto longitudinal projections, e.g., fins, of the kind hereinbefore described with reference to FIGS. 1 and 2, and whereby dissipation of heat from the reaction zone is further increased.

In operating the reactor shown in FIG. 5 the procedure is essentially the same as in the operation of the reactor shown in FIGS. 1 and 2. The reactant, e.g. AcH, entering through the feed conduit 68 and the reactant, e.g., $O_2$, entering through the feed conduit 70, are mixed where indicated in the jet means 72 and then pass, together with the gaseous reaction products that are drawn into the ports 88, into the mixing nozzle 84 where the initial reactants and gaseous reactions products are mixed together. The mixture then passes upward through the eductor 90 into the shell of heat exchanger 98, and thence outward through the ports 116. Part of the product is drawn off through product take-off conduit 128 while the remainder of the gaseous reaction products is drawn through the ports 88, mixed with the incoming feed reactants and then recirculated as hereinbefore has been described.

The operating conditions and the procedure followed in isolating the product from the reactor illustrated in FIG. 5 are essentially the same as herein described with particular reference to the operation of the reactor shown in FIGS. 1 and 2.

In the preferred embodiment of this invention, the hereinbefore described method is carried out continuously. Hence all the individual steps comprising the method are carried out continuously. The various steps also may be carried out substantially concurrently, especially when the reactor is operating under steady-state conditions. Under the latter conditions there is continuously withdrawn from the reaction zone a portion only of the contents of said zone that has substantially the same composition as the remainder of the contents of the reaction zone.

The apparatus and method of the present invention are especially useful in making peroxides of aliphatic acids, more particularly saturated aliphatic acids such as the $C_2$ through $C_6$ saturated aliphatic acids and specifically acetic acid, by oxidation of vapors of the corresponding aliphatic aldehyde with gaseous $O_2$.

Taking acetaldehyde (AcH) as illustrative of the aldehyde employed in the production of the corresponding peroxy acid, viz., peracetic acid (AcOOH), this may be done in accordance with the present invention, for instance as follows:

The general procedure is exactly the same as described hereinbefore. The proportion of $O_2$ in the feed should be kept relatively low so as to avoid a mixture which is explosive under prevailing conditions. A safe proportion of $O_2$ in the feed mix is about 12 mole percent or less. It is desirable to have present at least 5 mole percent $O_2$, and preferably higher (e.g., from about 7 to about 9 mole percent), in the feed mix. The oxygen can be in substantially pure form or it may be admixed with an inert diluent, e.g., in the form of air. Using substantially pure oxygen admixed with a controlled amount of nitrogen, e.g., about 3 vol. percent to about 7 vol. percent, specifically about 5 vol. percent, of nitrogen based on the total volume of oxygen and nitrogen in the feed, facilitates control of the operation by simplifiying the determination of the percent of oxygen conversion.

Instead of nitrogen one may use various other diluent gases which are substantially inert under the conditions of the reaction, e.g., argon, helium, carbon dioxide, carbon monoxide or mixtures thereof.

The highest mole ratios of AcOOH to acetic acid (AcOH) are obtained when the oxygen is not completely reacted. Hence it is preferred to use conditions, including the mole ratio of $O_2$ to AcH in the feed material, such that less than 100%, e.g., about 98% or a little more, of the $O_2$ is reacted with the AcH. When these preferred conditions are employed, the gaseous reaction products withdrawn from the reaction zone contain a mole ratio of AcOOH to AcOH of at least about 10 to 1.

Ordinarily it is not necessary to preheat the gaseous components of the feed, and it is merely necessary to vaporize the AcH and to maintain it in that state until it enters the reactor. However, if desired, the AcH may be preheated to initiate the reaction during start-up, or for control purposes.

The reaction is effected at a temperature which is maintained within the range of from 80° C. to 200° C. Best results are obtained at temperatures up to about 180° C., preferably 120°–180° C., e.g., from about 130° or 140° C. to about 170° C. When the reaction pressure is from 20 to 25 p.s.i.g., particularly good results have been obtained using a reaction temperature of about 135° C.

The pressure of the reaction may range, for example, from 0 p.s.i.g. to 30 or 40 or even 50 or more p.s.i.g., as desired or as conditions may require. As the reaction pressure is increased, the temperature (for a given reactor residence time) required to obtain an oxygen conversion of, for example, 98% or higher decreases. In order to remove the heat of reaction, the temperature differential between the coolant and reaction media must, all other influencing factors, e.g., preheat, mixing, heat of reaction, etc., being equal, be maintained substantially constant. This means that at some pressure, e.g., of the order of 50 p.s.i.g., the coolant temperature will be sufficient to condense a portion of the reaction material—a condition that normally is undesirable. Hence, in the reactor design and under the conditions with which the present invention is concerned, the optimum pressure is probably of the order of 30 p.s.i.g.±5 p.s.i.g.

The time of contact or residence time in the reactor may be relatively long. The optimum time depends largely upon the reaction temperature and may range, for example, from 5 to 30 or 35 seconds or more when the reaction is effected at atmospheric or substantially atmospheric pressure. At higher pressures the reaction rate increases and the optimum time of contact will be less.

The separation of the peracetic acid and acetic acid from the reaction products withdrawn from the reactor may be effected in any convenient manner. In one efficient procedure the gaseous stream leaving the reactor is fed directly to the intermediate portion of a distillation column. An inert solvent is fed to the column, and a solution of peracetic acid and acetic acid in the solvent is taken off, as a liquid, from the bottom of the column. Vapors of unreacted acetaldehyde are taken from the top of the column, i.e., above the point of introduction of the gaseous stream leaving the reaction zone. These acetaldehyde vapors may be recycled to the reaction zone together with further quantities of $O_2$. Other gases such as unreacted $O_2$ (if present), or CO or $CO_2$ produced in the reactor, leave the system from the top of the aforementioned distillation column.

The solvent used in the distillation column is preferably one which boils between the boiling points of acetaldehyde and peracetic acid and, most preferably, below 80° C. Acetone, methanol, methylal, and methyl acetate are examples of such solvents. Water, also, may be employed as the solvent if desired.

The peracetic acid solution recovered from the base of the column also contains acetic acid, but this is not objectionable commercially.

A more specific example of the production of AcOOH by oxidizing AcH with $O_2$ is as follows:

EXAMPLE

The reactor is made of aluminum and has a capacity of 4.4 gallons. Its general construction is as shown in FIGS. 1 and 2 of the drawing. It is provided with fifteen 1″ x ⅛″ x 12″ aluminum longitudinal fins likewise constructed as shown in the drawing. The jet means including the eductor also are made of aluminum, and the sizes and arrangement of the various elements are the same as previously described and as illustrated in the drawing. The ratio of exposed surface to volume of this reactor is 0.37 cm.$^{-1}$. A 50 p.s.i.g. aluminum rupture disc is used.

To prepare the reactor or generator for operation, the surfaces are buffed lightly with No. 320 emery cloth wetted with distilled water. After buffing, the surfaces are washed thoroughly with distilled water and then dried with an acetone wash. The rupture disc also is washed with acetone. The reactor is then assembled and pressure checked. The reactor is found to passivate itself with $O_2$ during the first few hours that it is in operation.

As a first step in starting up the unit, the reactor is heated up with steam in the jacket to about 230° F. Nitrogen is passed through the reactor and the reactor pressure is set at 25 p.s.i.g.

AcH is charged to a 4-inch 18-tray flasher column where AcH vapors are taken off at 50 p.s.i.g. as feed to the AcOOH generator. These vapors are metered through an integral orifice flow meter to give a flow of about 17 lb./hr. The AcH vapors are passed through a heat exchanger just prior to entering the reactor to insure constant vapor temperature.

AcH and nitrogen vapors are passed through the reactor to a AcOOH recovery column. This is a 6-inch 36-tray aluminum column. Methyl acetate is fed to the column and the column is lined out to recover AcH overhead and methyl acetate (MeAc) as residue. About 5 standard cubic feet per hour (s.c.f.h.) of nitrogen ($N_2$) is added to the overhead of the recovery column to insure that when $O_2$ is fed to the reactor there will not be an explosive mixture in the overhead condenser.

After the flows are lined out and with AcH circulating properly, the introduction of oxygen to the reactor is begun by admixing it in small increments with the AcH feed to the reactor; or, in start-up operations, the individual increment of $O_2$ may be added in lieu of the AcH feed.

Thus, the $O_2$ may be added with the AcH about 12 to 18 inches upstream of the reactor. After each addition of oxygen, a gradual rise in reactor temperature is noted. After about 3 to 5 minutes, oxygen appears in the event from the recovery column. The $O_2$ concentration in the event is monitored to determine the extent of conversion. Conversion of at least 50% of the oxygen at each stage in the introduction of oxygen is desirable in order to obviate the passage of any substantial quantity of unreacted oxygen from the reactor. The full flow rate of the oxygen to the reactor is 1.34 lbs./hr. After this flow rate has been established, the reactor temperature is adjusted to give the desired conversion. In the run of this example the reaction temperature is 135° C. The normal $\Delta T$ between the reactor and its jacket is about 7° C. (45° F.).

Under steady-state operating conditions the feed to the reactor contains about 7 mole percent $O_2$, about 5 mole percent nitrogen and the remainder AcH. (If desired, the nitrogen may be omitted.) The reactor pressure is about 25 p.s.i.g. The average residence time in the reactor is about 25 seconds.

The recovery column is run at atmospheric pressure. With a 25 wt. percent solution of AcOOH in MeAc as the residue stream, the column base temperature is approximately 160° F.

One hundred parts per million of a chelating agent (Victor 53) is added as a stabilizer, in a solution of AcOH and MeAc, to the base of the recovery column with a pump. The recovery column base stream is analyzed periodically for AcCOOH and AcOH content. The mole ratio of AcOOH to AcOH is above 2 to 1, more particularly about 3 to 1. The oxygen conversion is about 94–99%, more particularly about 98%.

It is to be understood that the foregoing detailed description is given merely by way of illustration and not by way of limitation and that many variations may be made therein without departing from the spirit of the invention.

The embodiments of the invention in which an exclusive property or privilege is claimed are defined as follows:

1. Apparatus adapted for carrying out chemical reactions in the gaseous phase comprising, in combination:
   (A) a reaction chamber provided with side and end walls defining a reaction zone;
   (B) a heat exchanger, comprising a tube bundle enclosed within a shell, mounted within the upper portion of said reaction chamber, the space enclosed by said shell communicating, by openings in said shell, with the space surrounding said shell and within the side walls of the upper portion of said reaction chamber whereby gases may circulate freely from the interior of said shell into said surrounding space;
   (C) jet means, extending into said chamber through a wall thereof, comprising an actuating nozzle connected to discharge through a mixing nozzle and a diffuser into said heat exchanger shell, said mixing nozzle having suction ports communicating with the lower portion of said reaction chamber so that the content thereof can be drawn into said mixing nozzle, said actuating nozzle being connected for charging therethrough the gaseous feed to the reaction chamber whereby said feed is thoroughly mixed in said mixing nozzle with gaseous contents of the reaction chamber before being discharged into the heat exchanger shell;
   (D) heat-dissipation means positioned within said reaction zone in the space surrounding the sides of said heat exchanger shell and within the side walls of said reaction chamber for controlling the temperature within said reaction zone; and
   (E) means including an opening in a wall of said chamber for withdrawing the reaction products.

2. Apparatus as in claim 1 which additionally includes a heat-transfer jacket surrounding at least the side of the reaction chamber.

3. Apparatus as in claim 1 wherein the heat-dissipation means comprises fins spaced apart along the circumference of, and attached to, the inner side wall of said reaction chamber, said fins extending partway inwardly toward the central area of said chamber.

4. Apparatus as in claim 1 where in the heat-dissipation means comprises a plurality of spacer-apart longitudinal tubes, adapted for the circulation of a heat-transfer fluid therethrough, which are spaced from, and parallel with, the side wall of the reactor.

5. Apparatus as in claim 1 wherein the ratio of exposed surface to volume within the reaction chamber is below about 1 cm$^{-1}$.

6. A gas-phase reactor as in claim 1 wherein the jet means includes
   (A) an actuating nozzle through which at least one feed reactant to the reactor first passes;
   (B) a mixing nozzle, and
   (C) a discharge end,
   the outlet of the said actuating nozzle being in operative relationship with the said mixing nozzle, and said jet means being provided with openings whereby gaseous contents of the reactor are drawn into the said mixing nozzle and are discharged from the said discharge end thoroughly mixed with the fresh feed.

7. Apparatus as in claim 1 wherein the jet means includes
   (A) a conduit adapted to receive a first feed reactant and terminating at its forward end in a mixing nozzle;
   (B) an actuating nozzle adapted to receive a second feed reactant and having an outlet opening the size of which can be regulated during operation of the reactor, the said opening of the said actuating nozzle being in operative relationship with the said mixing nozzle during reactor operation; and
   (C) a discharge end connected to the heat exchangers; said jet means being provided with openings whereby gaseous contents of the reactor are drawn, during operation, into the said mixing nozzle and are discharged into the said heat exchanger thoroughly mixed with the fresh feed.

8. Apparatus as in claim 7 wherein the actuating nozzle is provided with a needle valve for regulating the size of its outlet opening during operation of the reactor.

9. A gas-phase reactor comprising, in combination:
   (A) a cylindrical reaction chamber provided with side and end walls defining a reaction zone;
   (B) a heat exchanger, comprising a heat-exchange tube bundle enclosed within a shell, mounted within the upper end of said reaction chamber, the space enclosed by said shell and containing said tube bundle communicating by openings in the upper portion of said shell with the annular space between the outer wall of said shell and the inner wall of the upper end of said reaction chamber whereby gases may flow freely from the interior of said shell into said annular space;
   (C) jet means, extending into said chamber through a wall thereof, comprising an actuating nozzle connected to discharge through a mixing nozzle and a diffuser into the lower portion of said heat exchanger shell, to which said diffuser is attached, said mixing nozzle having suction ports communicating with the lower portion of said reaction chamber so that the contents thereof can be drawn through said ports into said mixing nozzle, said actuating nozzle being connected for charging therethrough the gaseous feed to the reaction chamber whereby said feed is thoroughly mixed in said mixing nozzle was gaseous contents of the reaction chamber before being discharged through said diffuser into said heat exchanger shell;

(D) heat-exchange means, comprising a plurality of spaced-apart tubes positioned longitudinally, in said annular space between the outer wall of said heat exchanger shell and the inner side wall of said reaction chamber, said tubes being connected for the circulation of a heat-transfer fluid therethrough; and (E) means including an opening in a wall of said chamber for withdrawing the reaction products.

10. The reactor of claim 9 additionally including a heat-transfer jacket surrounding at least the side wall of the reaction chamber.

References Cited

UNITED STATES PATENTS

| | | | |
|---|---|---|---|
| 2,631,159 | 3/1953 | Keith | 23—284 XR |
| 2,855,449 | 10/1958 | Owen | 23—285 XR |
| 2,868,627 | 1/1959 | Kolbel et al. | 165—108 XR |
| 2,907,644 | 10/1959 | Cunningham et al. | 23—284 |

J. H. TAYMAN Jr., Primary Examiner

U.S. Cl. X.R.

23—284, 288; 260—502; 165—106, 108

UNITED STATES PATENT OFFICE
CERTIFICATE OF CORRECTION

Patent No. 3,522,017                                          July 28, 1970

Jesse P. Barfield, Jr.

It is certified that error appears in the above identified patent and that said Letters Patent are hereby corrected as shown below:

Column 11, lines 4 and 6, "event", each occurrence, should read -- vent --:

Signed and sealed this 16th day of March 1971.

(SEAL)
Attest:

Edward M. Fletcher, Jr.                              WILLIAM E. SCHUYLER, JR.
Attesting Officer                                              Commissioner of Patents